(12) United States Patent
Rolston et al.

(10) Patent No.: US 7,537,394 B2
(45) Date of Patent: May 26, 2009

(54) METHOD FOR ASSEMBLING A TWO SUBSTRATE PARALLEL OPTICAL SUB-ASSEMBLY

(75) Inventors: David R. Rolston, Beaconsfield (CA); Richard Mainardi, Montréal (CA); Shao-Wei Fu, Montréal (CA); Robert Varano, Montréal-Nord (CA)

(73) Assignee: Reflex Photonics Inc., Montréal, Québec (CA)

( * ) Notice: Subject to any disclaimer, the term of this patent is extended or adjusted under 35 U.S.C. 154(b) by 0 days.

(21) Appl. No.: 12/131,461

(22) Filed: Jun. 2, 2008

(65) Prior Publication Data

US 2009/0087146 A1 Apr. 2, 2009

Related U.S. Application Data

(62) Division of application No. 11/862,594, filed on Sep. 27, 2007.

(51) Int. Cl.
*G02B 6/36* (2006.01)
*G02B 6/30* (2006.01)
(52) U.S. Cl. .............................. 385/89; 385/49; 385/91
(58) Field of Classification Search .................. 385/49, 385/89, 91
See application file for complete search history.

(56) References Cited

U.S. PATENT DOCUMENTS

| 4,766,705 | A | 8/1988 | Dholakia |
| 5,960,141 | A | 9/1999 | Sasaki et al. |
| 6,054,716 | A | 4/2000 | Sonobe et al. |
| 6,173,098 | B1 | 1/2001 | Steijer et al. |
| 6,269,209 | B1 | 7/2001 | Terada et al. |

(Continued)

FOREIGN PATENT DOCUMENTS

EP 0466950 10/1998

(Continued)

OTHER PUBLICATIONS

Connector Cover to Bevelled Surfaces for Visual Alignment, vol. 39, No. 3, Mar. 1996, XP 000581692, IBM Technical Disclosure Bulletin, p. 279.

*Primary Examiner*—Sung H Pak
*Assistant Examiner*—Daniel Petkovsek
(74) *Attorney, Agent, or Firm*—Ogilvy Renault, LLP

(57) ABSTRACT

There is provided an optical assembly and a method for assembling components of the optical assembly, the method comprising: providing a structure for guiding light; providing a plurality of optical fibers embedded in a fixed arrangement in the structure, the optical fibers for coupling the light from a coupling surface the structure; abutting a first package against the coupling surface, such that each one of multiple elements comprised in the first package is substantially aligned with each one of a first group of optical fibers in the plurality of optical fibers; and abutting a second package against the coupling surface, adjacent to the first package, and such that: the first and the second package are spaced apart by a gap; and each one of multiple elements comprised in the second package is substantially aligned with each one of a second group of optical fibers in the plurality of optical fibers, the gap providing a tolerance in a position of any one of: each one of the elements in the packages; the packages with respect to each other; and each one of the packages with respect to the structure.

9 Claims, 13 Drawing Sheets

U.S. PATENT DOCUMENTS

| | | | |
|---|---|---|---|
| 6,490,392 B1 * | 12/2002 | Munekata et al. | 385/31 |
| 6,709,607 B2 * | 3/2004 | Hibbs-Brenner et al. | 216/24 |
| 6,893,162 B2 * | 5/2005 | Vegny et al. | 385/59 |
| 7,234,874 B2 * | 6/2007 | Morse et al. | 385/53 |
| 2002/0001869 A1 | 1/2002 | Fjelstad | |
| 2002/0181899 A1 | 12/2002 | Tartaglia et al. | |
| 2003/0068137 A1 | 4/2003 | Rolston et al. | |
| 2004/0114859 A1 | 6/2004 | Colgan et al. | |

FOREIGN PATENT DOCUMENTS

| | | |
|---|---|---|
| EP | 1335221 | 2/2002 |

\* cited by examiner

METHOD FOR ASSEMBLING A TWO SUBSTRATE PARALLEL OPTICAL SUB-ASSEMBLY

CROSS-REFERENCE TO RELATED APPLICATIONS

The present application is a divisional of U.S. patent application No. 11/862,594 filed on Sep. 27, 2007, the contents of which are hereby incorporated by reference. The present application also relates to U.S. Pat. No. 7,178,235 granted Feb. 20, 2007 entitled METHOD OF MANUFACTURING AN OPTOELECTRONIC PACKAGE and U.S. Pat. No. 7,197,224 granted Mar. 27, 2007 entitled OPTICAL FERRULE, the specifications of which are hereby incorporated by reference.

FIELD OF THE INVENTION

This description pertains to the field of precision alignment of multiple devices. More precisely, it relates to the field of optical alignment of three or more elements.

BACKGROUND OF THE PRESENT INVENTION

There has been much work devoted to the alignment of lasers (or photodetectors) with optical fibers to provide for the maximum amount of coupling and subsequent transmission of light along an optical fiber. Most products are based on a single laser aligned to a single optical fiber—an example is the SFP optical transceiver, with a well aligned transmitter module and a well aligned receiver module; each with a single optical fiber coupling in an LC connector housing.

However, due to ever growing demands for bandwidth in smaller overall volumes of space (known as a higher bandwidth-density) there has been an increasing trend towards parallel optical modules where multiple lasers are aligned to multiple optical fibers in a single module—an example of this is the SNAP-12 parallel optical transceiver with 12 optical channels in an area roughly 1-cm×1-cm. Both single and multiple optical channel modules require well positioned and well toleranced sub-components and holders—such as described by Gallup, et al., U.S. Pat. No. 6,955,480 granted Oct. 18, 2005 and Kanazawa, et al., U.S. Pat. No. 6,179,483 granted Jan. 30, 2001. Furthermore, they are usually aligned while actively monitoring the optical power levels, to or from the optical fiber, to ensure the highest possible coupling (lowest insertion loss)—this is especially true for modules with long link distances (> 1-km) that are based on single mode optical fiber, but also is needed for modules with shorter link distances (> 300-m) that are based on multimode optical fiber.

The principle behind the alignment of the parallel optical module has been to use several levels of aligned module or components starting with photo-lithographically defined patterned arrays of lasers (or photodetectors). These arrays can be made with extremely high resolution, typically better than 1-micron tolerance for 12 lasers on a 250-micron pitch. These VCSEL arrays of lasers are produced as single chips roughly 3-mm×0.3-mm×0.15-mm with 12 lasers in a row. The alignment between the laser array and the optical fibers requires a more complicated set of parallel holders and relay optics—such as a patterned microlens array and an MT-style optical ferrule—but requires the same alignment methodology as the single laser module—just done on both ends of the array at the same time. The difficulty here is that alignment is time consuming, requires additional components (like relay microlenses with dowel pin alignment post), requires the lasers to be powered-on for active alignment, and requires precision pick-and-place techniques to place the VCSEL chips.

A further complication to this alignment strategy for parallel optical modules, has been an increasing demand to include both out-going and in-coming optical signals within the same single, small form-factor module. This requires that both the laser arrays (VCSELs) and photodetector arrays (PDs) be placed along side each other where a single high-density optical connector (such as the MT ferrule) is used to maintain the bandwidth-density advantage of the module. A few examples of modules which have both out-going and in-coming optical data signals are the POP-4 transceiver and the QSFP transceiver. This type of alignment requires three independent parts to be aligned with respect to each other where typically the VCSEL and PD arrays are aligned together, such that they are pitched on 250-micron centers and in co-linear position of their active areas (and not necessarily the sides of the chips). This further compounds the earlier active alignment issues as describe above and increases the alignment time, the set-up time and the accuracy of the equipment required.

SUMMARY

The present description provides a method and apparatus for the alignment of 2 (or more) optoelectronic devices with a single structure containing multiple optical waveguides or optical fibers.

This description relates to the optical coupling of light that requires multiple optical coupling operations to micron (or sub-micron) tolerance levels to produce an optical sub-assembly comprised of both input and output electrical signals and input and output optical signals for bi-directional optical components.

This description provides concepts that are directed towards the manufacturability of volume quantities of bi-directional optical sub-assemblies. This assembly provides for a low-profile, robust sub-component that can be used in a variety of optical modules. Furthermore, the methods described to construct the sub-component allow for low-cost manufacturing.

The description provides a means for bi-directional optical data communications using at least 2 optical channels and consists of at least one light emitting device on a chip that has been mounted on an electrical interconnecting substrate, at least one light detecting device on a chip that has been mounted on an electrical interconnecting substrate, and an optical guiding structure that holds at least 2 optical channels, where at least one optical channel is for output optical signals and the other is for input optical signals. Structures that contain multiple pathways for light, such as a polymer waveguides or a structure that contains a lens array can also be envisioned.

Many of the optical alignment techniques used to align an optoelectronic device on a substrate to an optical guiding structure are described in both the OPTICAL FERRULE patent and U.S. Pat. No. 7,178,235 entitled METHOD OF MANUFACTURING AN OPTOELECTRONIC PACKAGE. However, several novel optical alignment aspects are involved when aligning three (or more) independent objects, especially when each component involves more than 1 optical channel, without the use of expensive pick-and-place equipment. Prior art, such as the method and assemblies used in the alignment of bi-directional, parallel POP-4 transceiver modules, as shown in FIG. 01, are based on first aligning each optoelectronic chip to a common carrier and also to each other. The next step is to align the optical guiding structure, in this case the microlens array, to the pair of optoelectronic chips.

In this description, there is still basically the same number of optical alignment steps, except that they are performed in a different sequence and done on different, specially designed, sub-components. Each optoelectronic chip, the emitter chip and the detector chip, is aligned to the optical guiding structure independently from the other. Once all fixed together, the final assembly can then be mounted on a common carrier (typically a printed circuit board) and connected electrically. In this way, the very precise mechanical placement of very small devices, such as the optoelectronic chips, can be eliminated and thus the cost can be reduced as well as the time required.

Another aspect of this description is that the vertical spacing of the active area of the emitter array to the optical interface of the optical guiding structure can be different from the vertical distance between the active area of the detector array and the optical interface of the same optical guiding structure.

Yet another aspect of this description is that the electrical connections (such as wirebonds) between the optoelectronic arrayed devices and their respective substrates can tolerate a large variation in ideal position as does the electrical connection between the completed optical assembly and the common carrier. The type of optical alignments proposed combined with the positional flexibility of the electrical connections to the conductive trace lines eliminate the need for precision pick-and-place equipment and speed up assembly time.

Accordingly, the present description provides an optical assembly comprising: a structure for guiding light; a plurality of optical fibers embedded in a fixed arrangement in the structure, each of the optical fibers having a coupling surface for coupling light from a side surface of the structure; and a plurality of packages abutted against the coupling surface, adjacent to each other and spaced apart to form at least one gap, each one of the packages comprising an element, the element being substantially aligned with the coupling surface of one of the optical fibers, the gap providing a tolerance in a position of at least one of: the element in the packages; the packages with respect to each other; and each one of the packages with respect to the structure.

Accordingly, the present description also provides a method for assembling components of an optical assembly, the method comprising: providing a structure for guiding light; providing a plurality of optical fibers embedded in a fixed arrangement in the structure, the optical fibers for coupling the light from a coupling surface the structure; abutting a first package against the coupling surface, such that each one of multiple elements comprised in the first package is substantially aligned with each one of a first group of optical fibers in the plurality of optical fibers; and abutting a second package against the coupling surface, adjacent to the first package, and such that: the first and the second package are spaced apart by a gap; and each one of multiple elements comprised in the second package is substantially aligned with each one of a second group of optical fibers in the plurality of optical fibers, the gap providing a tolerance in a position of any one of: each one of the elements in the packages; the packages with respect to each other; and each one of the packages with respect to the structure.

DETAILED DESCRIPTION

In one embodiment, a two substrate parallel optical sub-assembly is proposed that incorporates a laser array optoelectronic chip, a photodetector array optoelectronic chip and a means for coupling multiple light channels to and from each chip through a coupling side of the structure.

The two substrate parallel optical sub-assembly uses a single optical guiding structure composed of an arrangement of multiple, fixed, well-aligned or parallel optical guiding channels (or optical fibers) which may be embedded in the structure. The arrangement of the optical fibers in the structure may vary.

Figure 1:
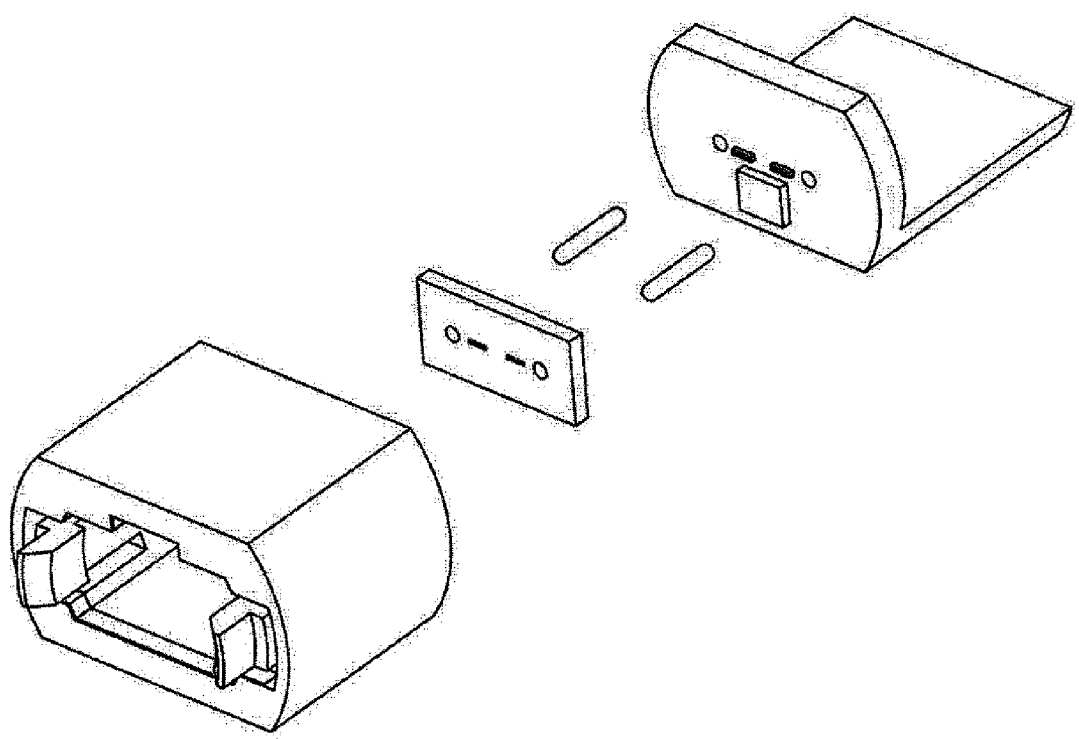
FIG. 01 is an exploded view of a transceiver assembly for a bi-directional parallel optical module in accordance with the prior art.
Figure 2:
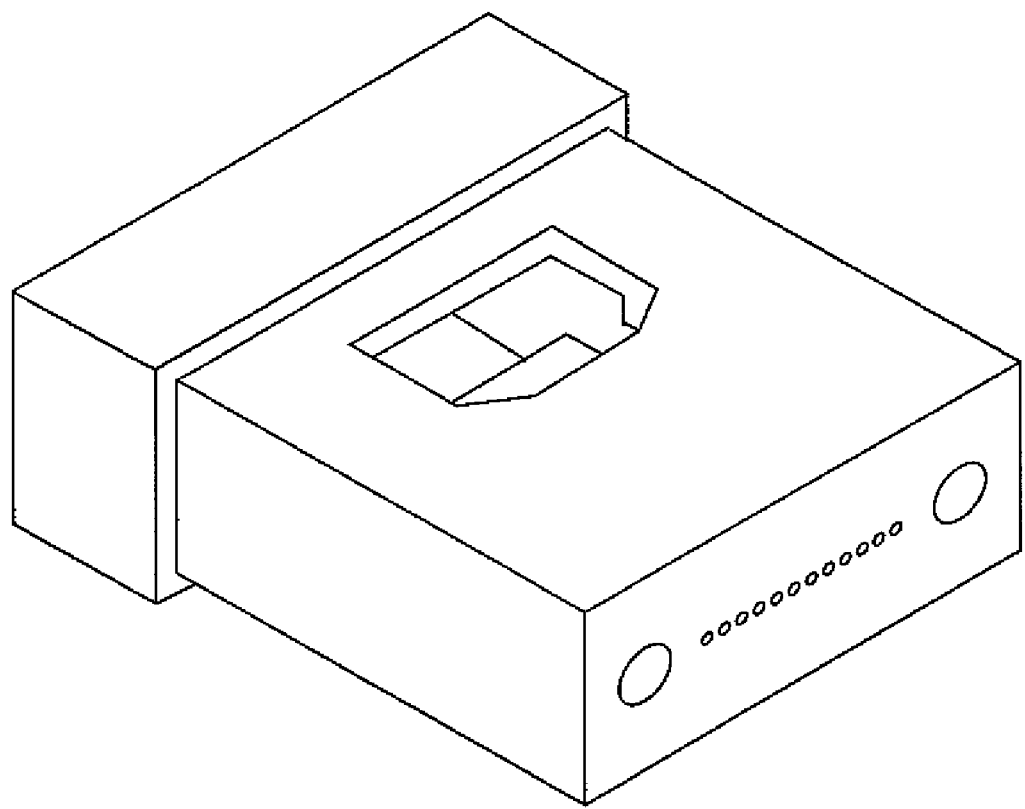
FIG. 02 is a perspective view of an MT-style parallel optical fiber ferrule in accordance with the prior art.

The optical guiding structure typically has a single "external" optical interface—like the multi-terminal (MT) style of parallel optical connector as shown in the prior-art example in FIG. 02—to maintain a high bandwidth-density ratio.

Figure 3:
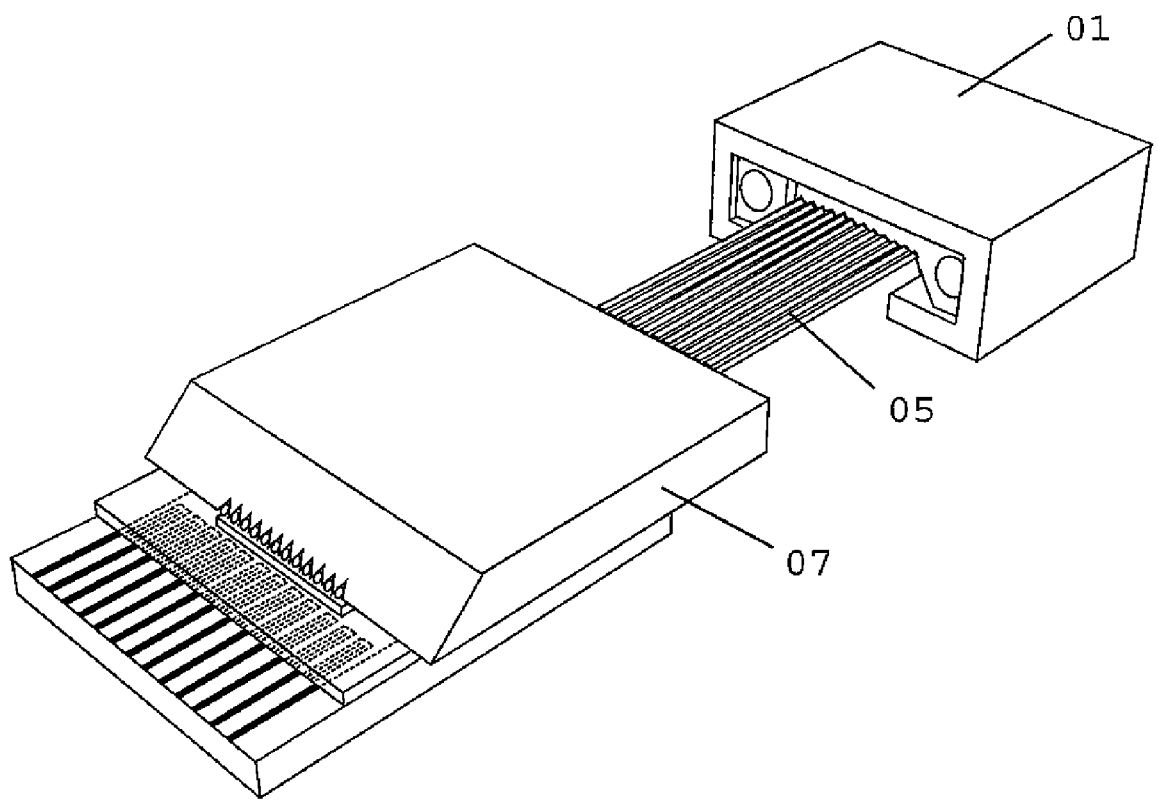
FIG. 03 is a perspective view of an optical ferrule in accordance with the prior art.

The optical guiding structure that is used herein is based on the prior art patent called an "OPTICAL FERRULE". Referring to FIG. 03, the prior art optical ferrule is composed of an MT-style optical connector [01] with two dowels pins [03] (only shown in FIG. 04a), a short optical fiber ribbon section [05], and silicon v-groove structure [07]. The structure 07 has a coupling side from which light is coupled. The structure also holds the beveled tips (or ends) [21] of the embedded optical fibers in place along the coupling side and such that a coupling surface of each of the optical fibers is substantially near a beveled side of the structure.

A precision end-couple ferrule member can be provided at a connector end opposite from the beveled side of the structure, for guiding a complementary ferrule member to end-couple fiber-to-fiber the plurality of optical fibers at the connector end, wherein the substantially flat coupling side is also near the connector end.

Figure 4A:
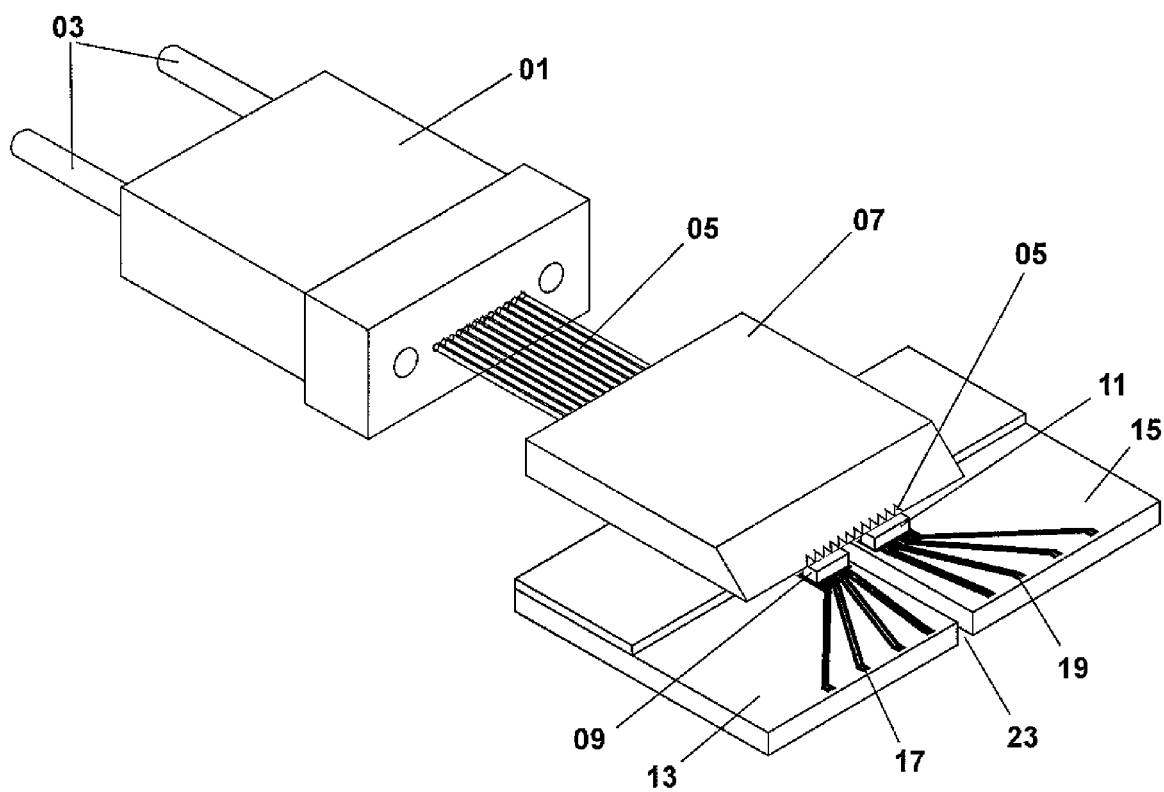
FIG. 04a is a perspective view of a two-substrate parallel optical sub-assembly in accordance with an embodiment described herein.

FIG. 04a shows an example of a two-substrate parallel optical sub-assembly, herein simply referred to as an optical assembly. The optical assembly has an optical guiding structure having an optical ferrule such as shown in FIG. 03. Each optoelectronic device, the VCSEL array [09] and the photodetector array [11], are attached to their own respective alumina substrates [13] and [15], and wirebonded to gold trace line electrical conductors [17] and [19].

Figure 4B:
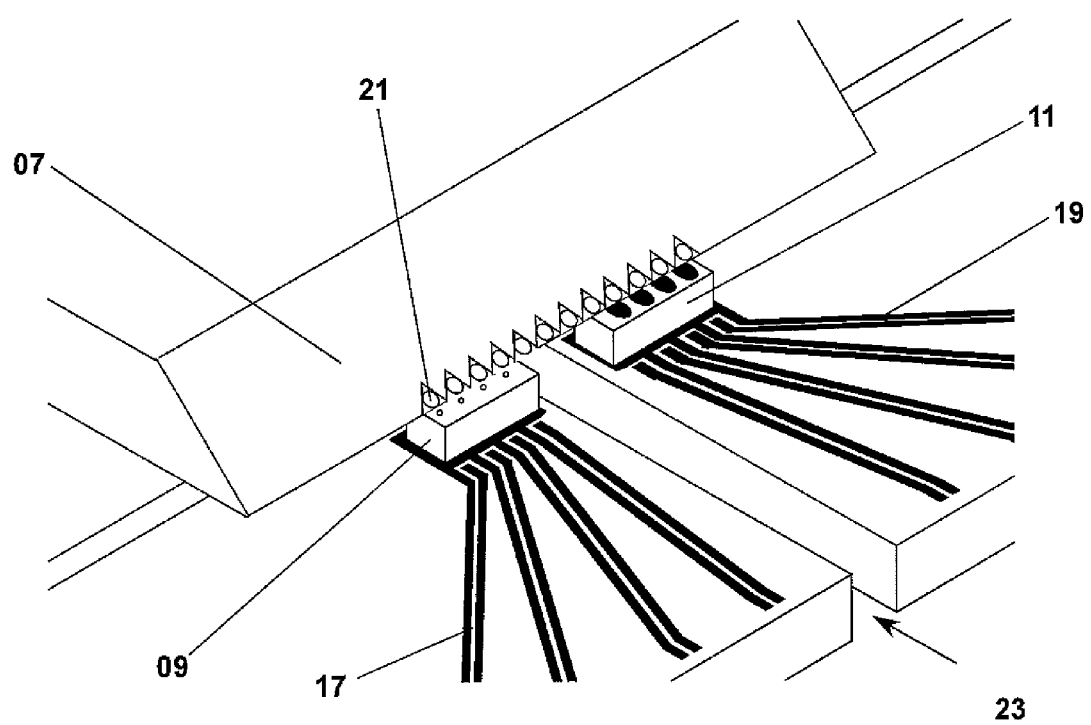
FIG. 04b is an enlarged view of the two-substrate parallel optical sub-assembly of FIG. 04a showing the optoelectronic chips and the optical coupling mechanism.

Referring to FIG. 04b, in this embodiment, the optical ferrule used has 12 aligned, parallel optical fibers [05] that have 45-degree beveled end tips [21] that are all co-linear and on a pitch of 0.25-mm, a close-up view of the tips of the optical fibers is shown in FIG. 04b.

Referring to both FIG. 4a and 4b, the other end of the optical ferrule is compatible with a single multi-terminal optical connector [01] called an MT ferrule. In this case, only 8 of the 12 optical channels are used—there are 4 transmitter channels (optical fibers), 4 unused channels (optical fibers) in the middle, and 4 receiver channels (optical fibers). The unused set of optical fibers is used as a separation (also referred to as a gap having a gap length) [23] between the transmitter and receiver groups of optical fibers to provide for some alignment clearances for the 2 alumina substrates. The 2 groups of optical fibers within the optical guiding structure are fixed in-place, with a fixed separation [23] defining a gap length.

Each alumina substrate has an optoelectronic chip fixed to its surface—a light emitting chip, the VCSEL array [09] and a light detecting chip, the photodetecting chip [11]. However, other combinations of emitter-emitter or detector-detector chips, especially for different wavelengths, can also be envisioned. The substrates are be designed so that they can be individually handled and not obstruct each other during optical alignment. In this particular embodiment, the alumina substrates have been designed to be long and narrow with the optoelectronic chips placed near either edge of each substrate.

Figure 5A:
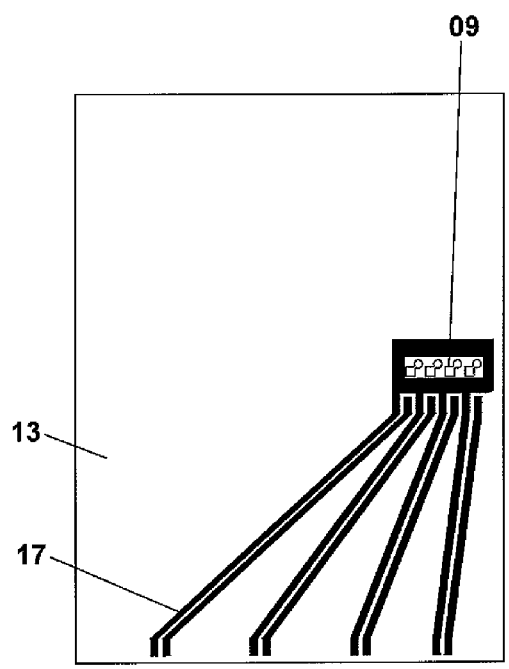
FIG. 05a is a top view of the alumina substrate of FIG. 04a and FIG. 04b, for a light emitting chip, with the maximum allowable positional tolerance of the chip on the substrate being indicated.
Figure 5B:
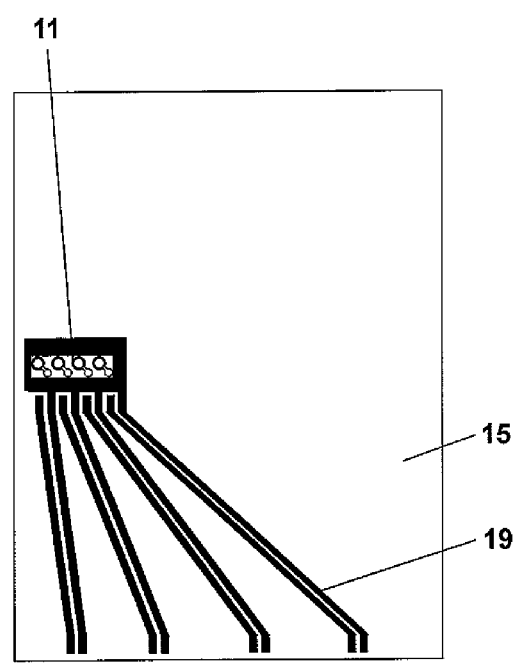
FIG. 05b is a top view of the alumina substrate of FIG. 04a, and FIG. 04b, for a light detecting chip, with the maximum allowable positional tolerance of the chip on the substrate being indicated.

The allowable positional and rotational tolerance of the optoelectronic chip on the substrate depends on the overall sizes and shapes of all the sub-components of the assembly. In this particular embodiment, the substrates are mirror images of each other, as in FIG. 05a and FIG. 05b. The nominal positional and rotational tolerance of each optoelectronic chip on their respective substrate is indicated in FIG. 06 by the dashed ovals [25] and [27] placed around each chip; the VCSEL chip [09] and a photodetecting chip [11], respectively.

In this particular case, one substrate contains a 1×4 VCSEL laser array that is 1-mm×0.3-mm in footprint and is placed near one edge of its respective alumina substrate and is wirebonded to the gold traces (wirebonds are not shown). The other substrate contains a 1×4 PD array that is 1-mm×0.3-mm in area and is placed near one edge of its respective alumina substrate and is wirebonded to the gold traces (wirebonds are not shown). Both optoelectronic chips [9] and [11] are placed on the edges of their respective alumina substrates [13] and [15] such that they are adjacent to one another and form a mirror-image pattern.

Figure 6:
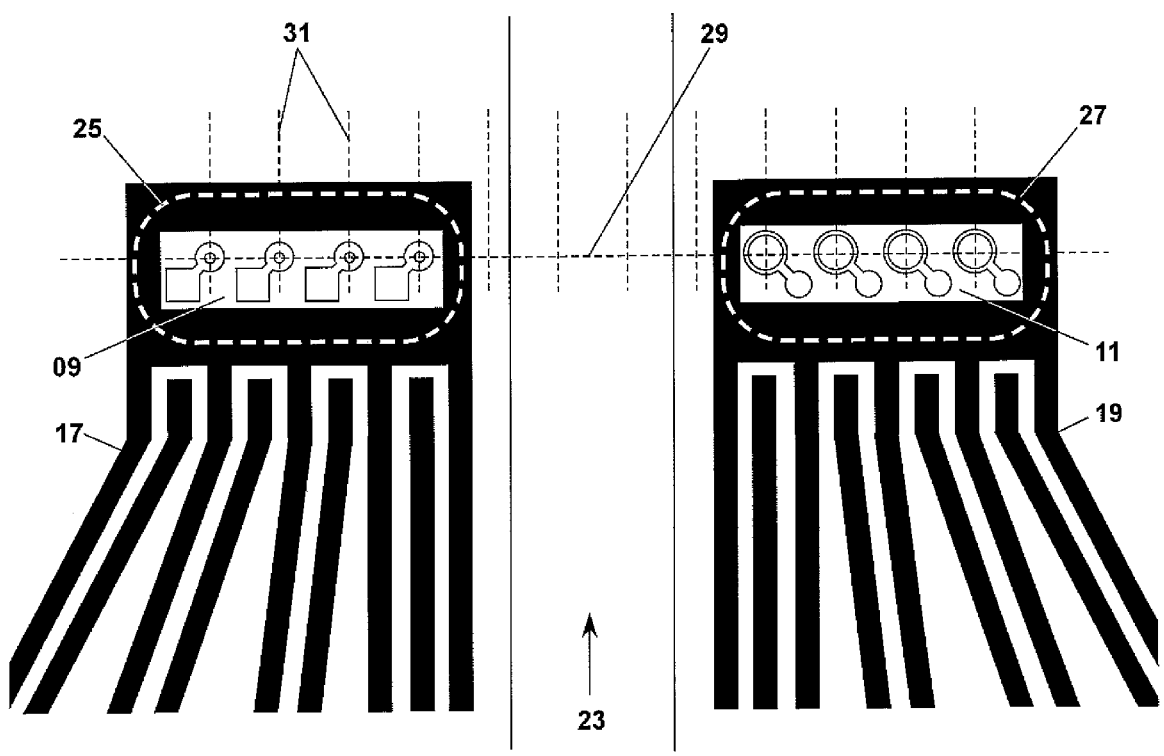
FIG. 06 is a top view of an ideal position of the light emitting chip with respect to the light detecting chip of FIG. 05a and FIG. 05b, on their respective alumina substrates.

Still as shown in FIG. 06, the centers of the active areas of the VCSEL chip [9] and the photodetector chip [11] lie along the dashed horizontal line [29]—it is noted that aligning the sides of the optoelectronic chips may not in fact align the centers of the active areas. At a minimum, most dice cuts along semiconductor chips have tolerances of more than +/− 25-microns, so the sides of the chips may not be sufficient to align the active areas properly with respect to one another.

A second alignment consideration is that of the pitch between the devices. The 12 vertical dashed lines [31] indicate a pitch of 0.25-mm between the centers of adjacent active areas for both chips. The dashed lines [31] continue in the space (also referred to as a gap) section [23] between the two independent substrates, as shown in FIG. 06. The pitch is also referred to as a distance between the centers of the active areas along the dashed horizontal line [29]. Hence, the gap length along the line [29] is greater than the distance between the centers of the active areas along the line 29].

As an example, given an optical ferrule that is 7-mm×7-mm in area, where the 12 optical fibers are parallel and vertically centered in the optical ferrule with a pitch of 0.25-mm, the gap between the 2 outer groups of 4 optical fibers is 1.125-mm. Given that the length (L) of each alumina substrate is 10-mm, it can be calculated that the positional tolerance of both the VCSEL [9] and PD arrays [11] with respect to their ideal positions is roughly +/− 0.3-mm in both x and y and have a rotational tolerance of +/− 2-degrees.

Figure 7A:
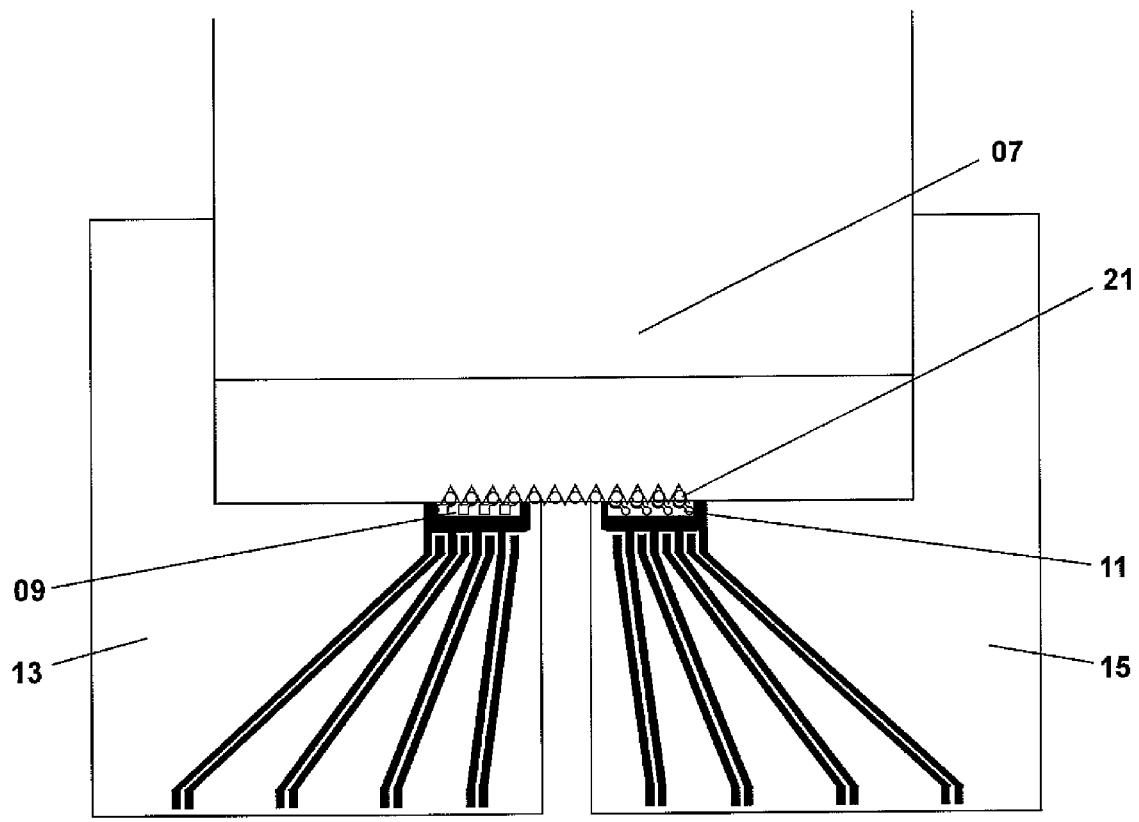
FIG. 07a is a top view of the two-substrate parallel optical sub-assembly of FIG. 04a and FIG. 04b, with the substrates and the optical ferrule being perfectly aligned and positioned.

Therefore, when the optoelectronic chips are well-aligned to the optical fibers [05] in the v-groove structure [07] of the optical ferrule, and they have also been well aligned to their substrate [13] or [15], the orientation as shown in FIG. 07a is obtained.

Figure 7B:
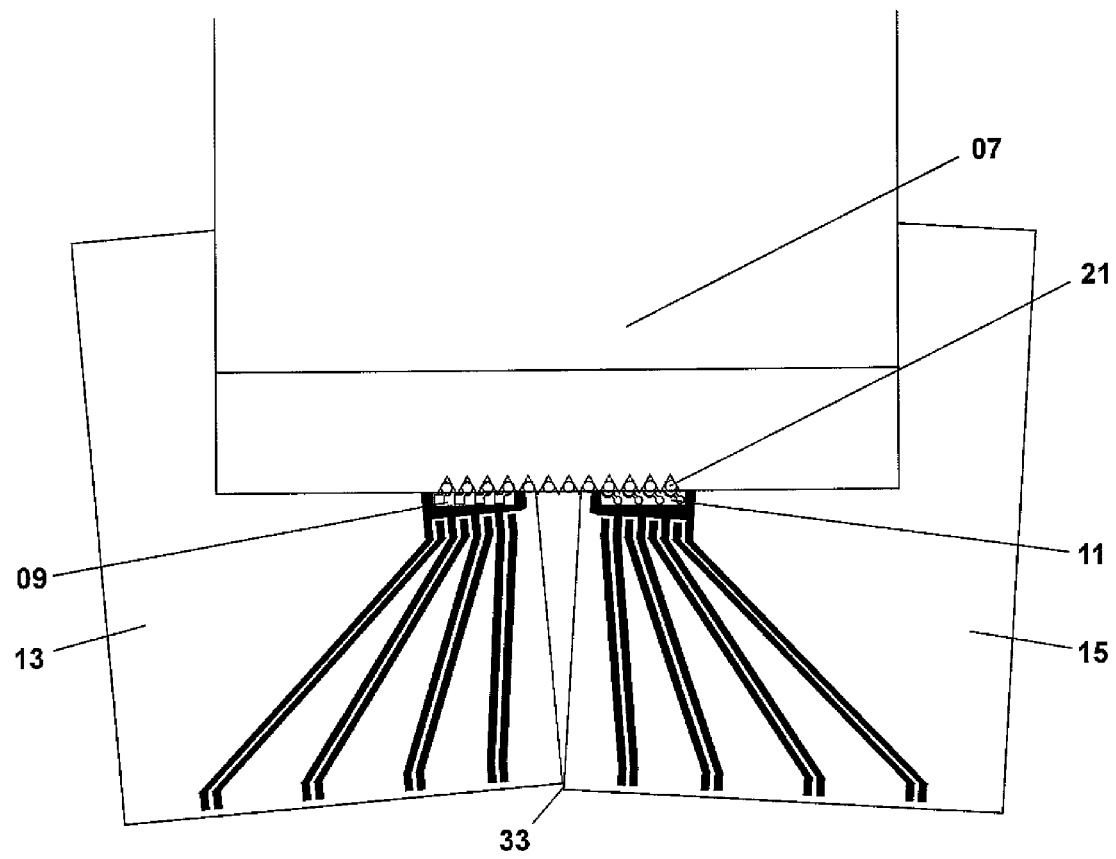
FIG. 07b is a top view of the two-substrate parallel optical sub-assembly of FIG. 04a and FIG. 04b, with the substrates and the optical ferrule being aligned but not perfectly positioned.

However, if the optoelectronic chips are placed with low positional and rotational accuracy on their substrate (but within the dashed oval boundaries [25] and [27] shown in FIG. 06), once the active areas of each chip [9] or [11] are aligned to the optical fibers of the optical ferrule, the orientation shown in FIG. 07b is obtained.

The worse case scenario is that the alumina substrates [13] and [15] will only just touch at one corner [33]. This relatively large placement tolerance therefore allows the optoelectronic devices [9] and [11] to be placed without the use of high-precision pick-and-place equipment and reduces the cost and time of the assembly.

Figure 8:
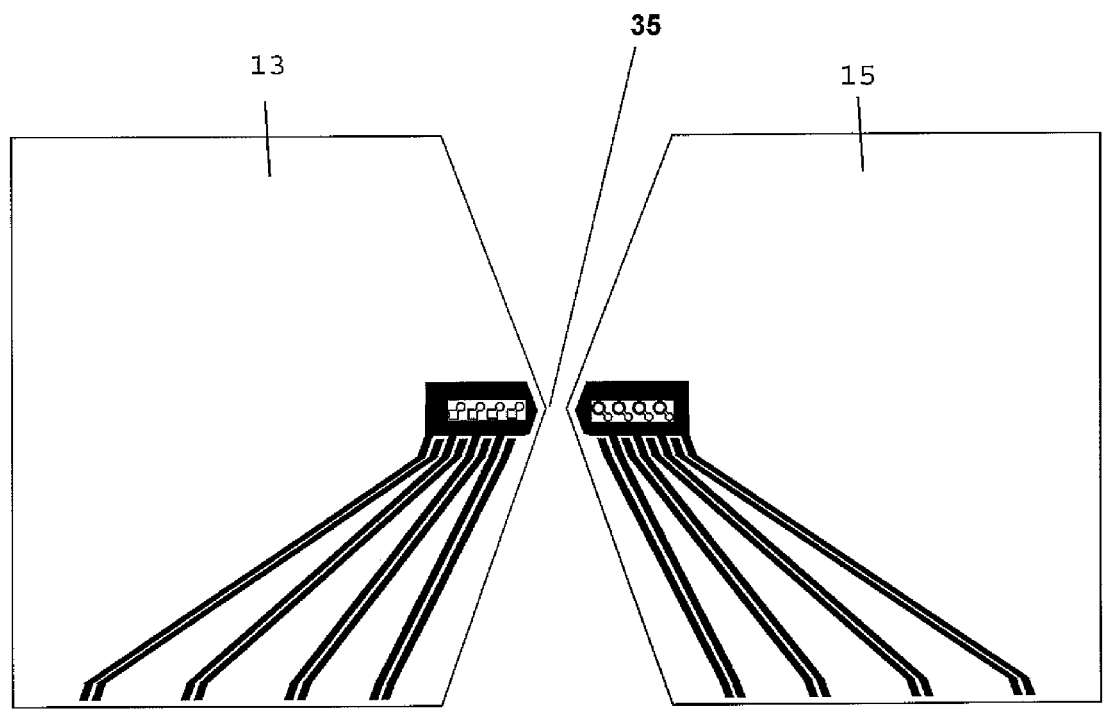
FIG. 08 is a top view of the two-substrate parallel optical sub-assembly of FIG. 04a and FIG. 04b, with the substrates having an alternative shape.

Other geometries for alumina substrates [13] and [15] exist. There are trade-offs between their manufacturability and their ease of alignment however. A specific example of another geometry would be to use substrates with protruding vertices [35], as shown in FIG. 08, where the optoelectronic chips would be placed near the vertex of their substrate [13] or [15]. This would lead to a greater tolerance to positional and rotational alignment of the two substrates (since the substrates would be much less likely to interfere with one another). Such substrate geometry could however be more difficult to manufacture. Other examples of substrate shapes and related trade-offs are also possible.

Figure 9:
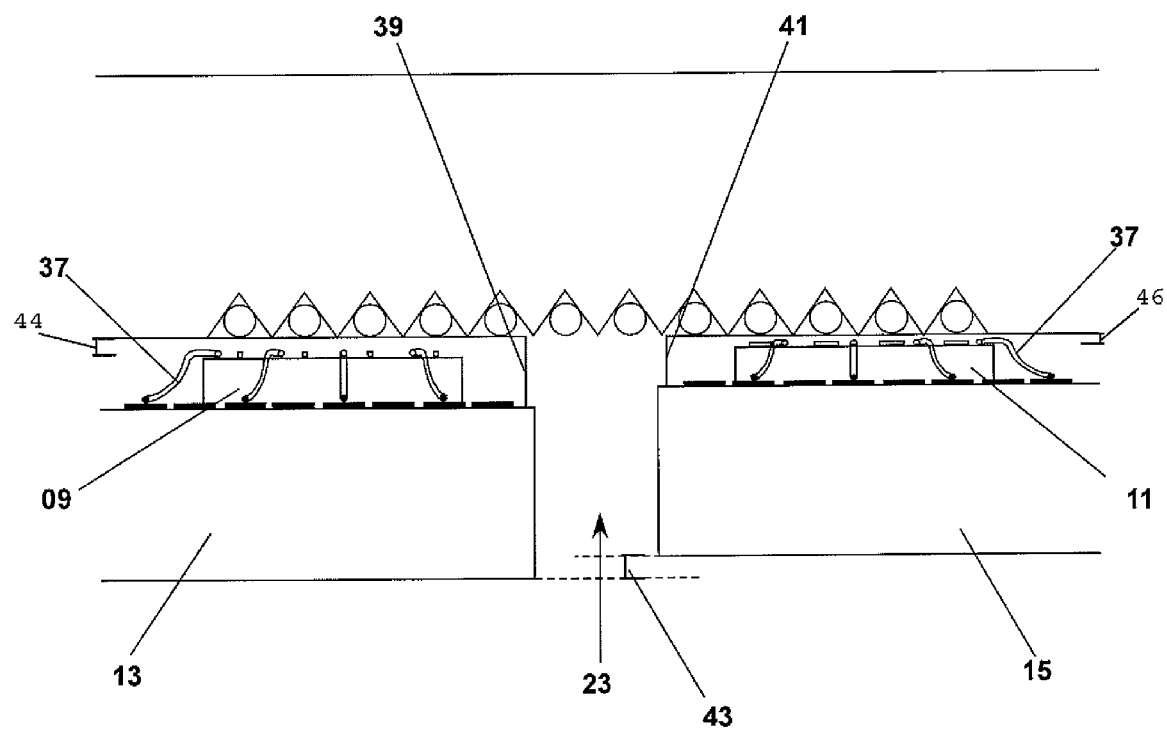
FIG. 09 is a front cross-sectional view of the two-substrate parallel optical sub-assembly of FIG. 04a and FIG. 04b, with the vertical height differences between the two substrates and the optical ferrule being shown.

Referring to FIG. 09, in addition to the positional and rotational placement of the optoelectronic chips [09] and [11] on their respective alumina substrates [13] and [15], the vertical height above the optoelectronic chip can be calibrated using a precision spacer (also referred to as a spacing device) [39] or [41] fixed to any of the substrates [13] or [15].

Different heights of emitter and detector optoelectronic chips can be accommodated by using different thickness for the spaces. A spacer can be made of glass or any other low-expansion precision cut material. The spacer can also accommodate differing optimal divergence conditions or lensing system requirements.

For example, FIG. 09 shows a front side view of the two substrate optical sub-assembly of FIG. 04a and FIG. 04b in a highly magnified but proportional view of the space (or gap) [23] and the two adjacent wirebonded [37] optoelectronic chips [9] and [11]. Assuming a 1×4 VCSEL array chip [09] which is 200-microns thick and requires a distance [44] of 132.5-microns between the laser aperture (or the active area of the lasting element on the chip [9]) and the centre of the optical fiber, a precision spacer of 280-microns [39] is needed.

With a 1×4 photodetector array [11] which is 150-microns thick and requires a distance [46] of 102.5-microns between the active area of the detector element and the centre of the optical fiber, a precision spacer of 190-microns [41] is needed.

Although a small vertical height difference [43] between the two substrates [13] and [15] may be incurred, these small differences can be handled in a variety of ways to maintain electrical and mechanical connections, such as different substrate thicknesses or the use of different amounts of epoxy and/or longer or shorter wirebonds or electrical connections between the chips and their substrates [37].

Figure 10:
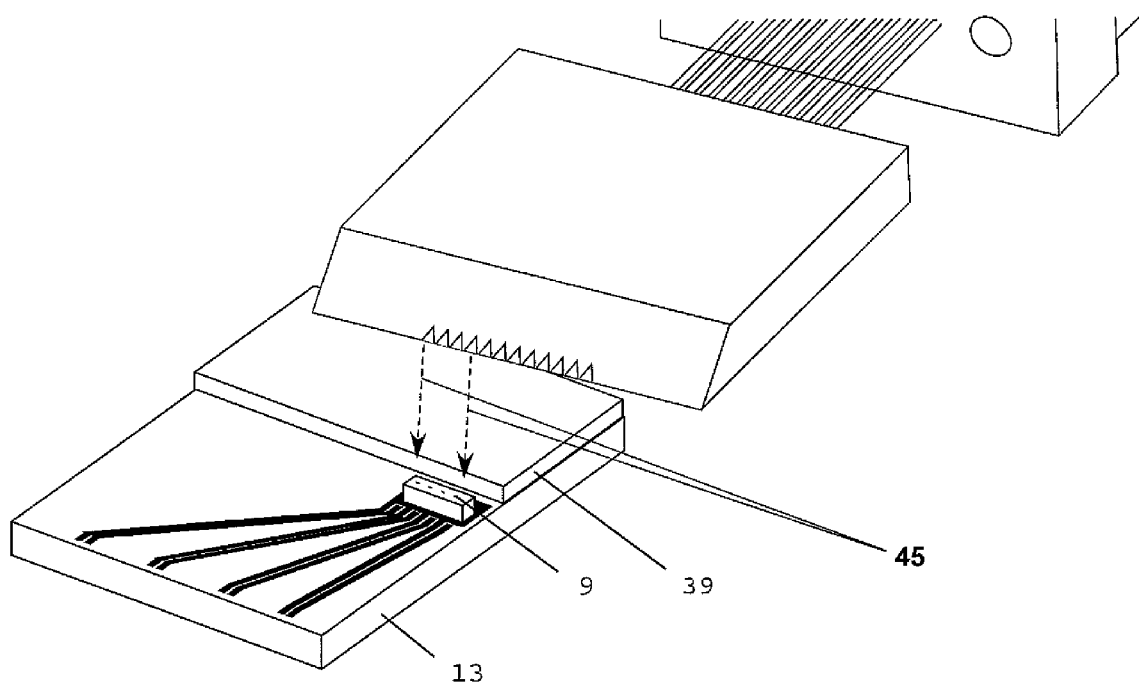
FIG. 10 is a perspective view of the two-substrate parallel optical sub-assembly of FIG. 04a and FIG. 04b, in an unassembled stage wherein the light emitting apertures are to be aligned with the ends of the optical fibers of the optical ferrule.

Alignment Procedure:

Where the optical guiding structure has the optical ferrule as described hereinabove, and when the useful channels of the optical ferrule are be the left-most 4 optical fibers and the right-most 4 optical fibers, with the middle 4 optical fibers being left unused, the alignment of the three parts (the optical ferrule with the two packages each comprising an optoelectronic device, a substrate and an optional spacer) are as follows:

The first alumina substrate [13] carrying a wirebonded 1×4 VCSEL array chip [9] as well as a vertical spacer [39] is aligned using a vision system so that the centers of each active area of each VCSEL are centered with the centers of the 4 optical fiber cores on one side of the body of the optical ferrule, as shown in FIG. 10.

The above alignment is done by holding the first alumina substrate [13] fixed in place while manipulating the body of the optical ferrule in x, y and rotation, as indicated by the dashed arrows [45], and while resting on the vertical spacer [39]. Resting on the spacer restricts the overall movement of the optical ferrule to only about 3 degrees of motion during an alignment which is performed by manipulating the optical ferrule using, for example, a vacuum chuck.

Figure 11:
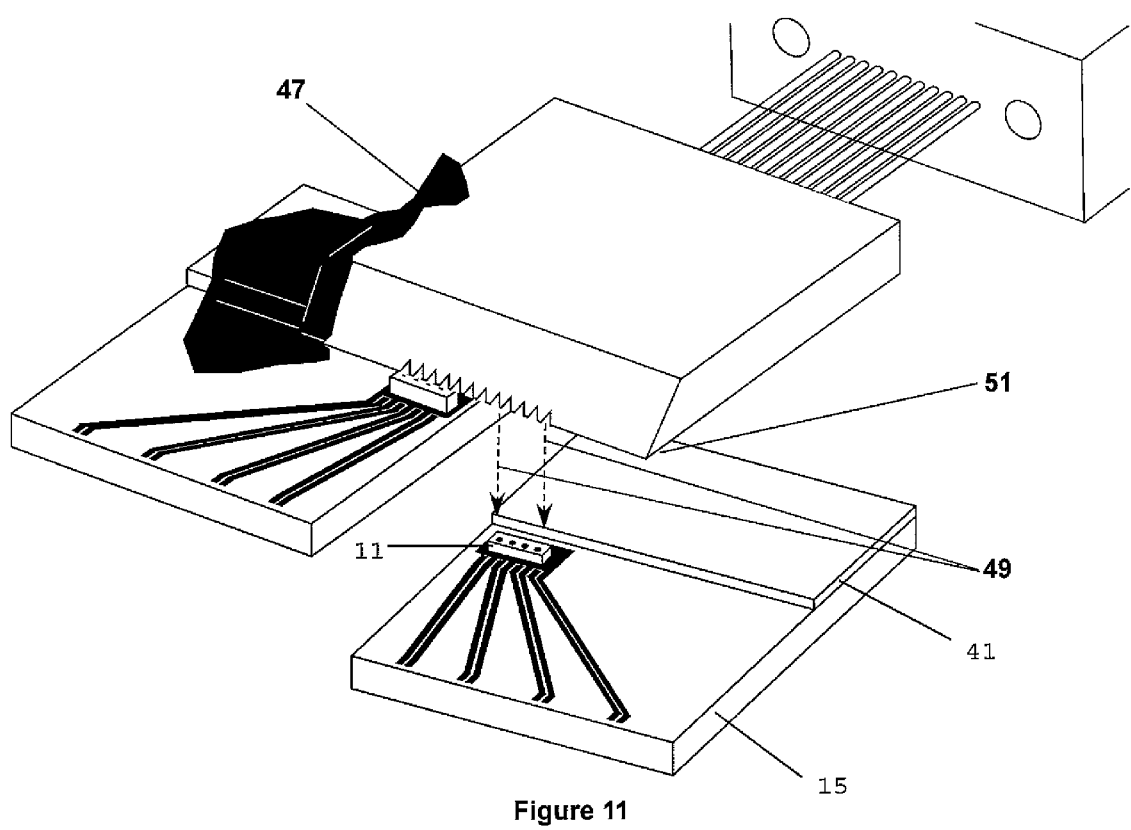
FIG. 11 is a perspective view of the two-substrate parallel optical sub-assembly of FIG. 04a and FIG. 04b, in an unassembled stage wherein the light detecting apertures are to be aligned with the ends of the optical fibers of the optical ferrule.

The first substrate [13] is then epoxy cured in place to the optical ferrule, as indicated by the black material [47] in FIG. 11.

Still referring to FIG. 11, the second alumina substrate [15] carrying a wirebonded 1×4 Photodetector array chip [11] as well as a vertical spacer [41] is then held fixed in place while the assembly of the optical ferrule with the first substrate [13] is manipulated in x, y and rotation, as indicated by the dashed arrows [49], and while resting on the vertical spacer [41] of the second substrate [15].

Once positioned and aligned over the second substrate [15], the optical ferrule can be held in place using a vacuum suction holder, for example, to allow the positioning of the centers of each of the fibers (also referred to as the centers of the coupling surfaces of the fibers) in the second group of 4 optical fibers over each one of the active areas of the elements in the array of elements of the photodetector chip [15]. A vision system is also used to perform the alignment. The vision system can be any system permitting a visual, unpowered alignment. Hence, there is no need to use passive mechanical stops or location borders. Such a system also avoids using a "blind" search for a maximal optical power to perform the alignment.

The second substrate [15] is then attached or epoxy cured in place to the body of the optical ferrule along side the first substrate [13] resulting in the assembly as illustrated in FIG. 04a (without the epoxy being shown). Other types or combinations of attaching device can be chosen depending on the attachment reliability level needed for a particular assembly. For example, such attaching devices can also be ultrasonic bonding, thermal bonding, or a mechanical clamp.

Once the second substrate [15] is attached to the body of the optical ferrule along side the first substrate [13], a defined gap [23] between the two substrates exists but its exact shape is determined by the initial positioning of the VCSEL and Photodetector chips on their respective substrates.

Other optical guiding structures can be envisioned for this geometry including lens arrays and parts made from polymer waveguiding materials. The basic premise is to align two very small parts to the same optical guiding structure—given that each part is on its own, larger, sub-mount and there is a provisioned amount of positional tolerance in the assembly to accommodate the independent movement of each sub-mount. This is in contrast to aligning the very small parts to each other and then aligning to an optical guiding structure.

The skilled person in the art will appreciate that in the above description, the optoelectronic chips [9] and [11], together with their respective substrate [13] and [15], represent packages having an array of elements. The elements can be any type semiconductor type devices having light emitting, light detecting or light guiding (such as microlenses) capabilities. Each of the elements is further characterized as having an active area to be aligned with the ends of the optical fibers in the structure when abutting the packages on the structure.

The above description refers to an optical assembly having two substrates, or two packages each comprising a substrate with elements being on the substrate. It is understood that an assembly having more than two packages can be assembled without departing from the scope of the description. The substrates can also be of any other material that alumina which is suitable for the placement of the elements desired, such as Silicon or Germanium alloys for example.

Moreover, the packages may be abutted against the structure in other manners as described, with or without the use of a spacing device to provide for a space between the elements of the packages and the optical fibers in the structure.

The invention claimed is:

1. A method for assembling components of an optical assembly, the method comprising:
    providing a structure for guiding light, the structure having grooves on a coupling side;

providing a plurality of optical fibers, each being embedded in a corresponding one of said grooves and having a coupling surface;

abutting a first package comprising a plurality of first elements against the coupling side, such that each one of the plurality of first elements comprised in the first package is substantially aligned with a corresponding one of a first group of optical fibers in the plurality of optical fibers;

attaching the first package to the structure;

abutting a second package comprising a plurality of second elements against the coupling side, adjacent to the first package, and such that: the first and second package are spaced apart by a gap; and each one of the plurality of second elements comprised in the second package is substantially aligned with a corresponding one of a second group of optical fibers in the plurality of optical fibers, the gap allowing a position of the plurality of second elements in the second package to be independent of a position of the plurality of first elements in the first package; and attaching the second package to the structure.

2. The method as in claim 1, wherein at least one of the abutting of the first package and the abutting of the second package comprises using a vision system.

3. The method as in claim 1, wherein the abutting of the first package comprises aligning a center of an active area of each one of the plurality of the first elements with a center of the corresponding one of the first group of optical fibers and the abutting of the second package comprises aligning a center of an active area of each one of the plurality of the second elements with a center of the corresponding one of the second group of optical fibers.

4. The method as in claim 1, wherein the abutting of the first package comprising providing a first spacing device between the coupling side and the first package.

5. The method as in claim 4, wherein the abutting of the first package comprises:

holding the first package and the first spacing device in a fixed position;

moving the structure until the elements of the first package are aligned with the coupling surface of the optical fibers of the first group in a one-to-one manner, the moving and the holding being performed simultaneously; and resting on the first spacing device while performing the moving.

6. The method as in claim 5, wherein the moving of the structure comprises using a vacuuming device.

7. The method as in claim 5, wherein the abutting of the second package comprises providing a second spacing between the coupling side and the second package.

8. The method as in claim 7, wherein the abutting of the second package comprises:

holding the second package and the second spacing device in a fixed position;

moving the structure until the elements of the second package are aligned with the coupling surface of the optical fibers in the second group of optical fibers in a one-to-one manner, the moving and the holding being performed simultaneously; and resting on the second spacing device while performing the moving.

9. The method as in claim 8, wherein the moving of the structure until the elements of the second package are aligned comprises using a vacuuming device.

* * * * *